(12) United States Patent
Sinker et al.

(10) Patent No.: US 6,619,889 B1  
(45) Date of Patent: Sep. 16, 2003

(54) CONVEYOR APPARATUS

(75) Inventors: Alastair Brenton Sinker, Guildford (GB); Michael James Hess, Nr Newbury (GB); David Andrew Hadfield, Rudgwick (GB)

(73) Assignee: Cyclotech Limited (GB)

( * ) Notice: Subject to any disclaimer, the term of this patent is extended or adjusted under 35 U.S.C. 154(b) by 0 days.

(21) Appl. No.: 09/807,852

(22) PCT Filed: Oct. 27, 1999

(86) PCT No.: PCT/GB99/03545

§ 371 (c)(1),  
(2), (4) Date: Jun. 25, 2001

(87) PCT Pub. No.: WO00/25886

PCT Pub. Date: May 11, 2000

(30) Foreign Application Priority Data

Oct. 29, 1998 (GB) .............................................. 9823613

(51) Int. Cl.⁷ .............................................. B65G 53/52
(52) U.S. Cl. .................. 406/92; 406/122; 406/136; 406/140; 406/146; 406/154
(58) Field of Search .................. 406/92, 122, 124, 406/136, 139, 140, 146, 154, 194; 222/630, 635

(56) References Cited

U.S. PATENT DOCUMENTS

| | | | | |
|---|---|---|---|---|
| 1,991,403 A | * | 2/1935 | McManamna | 406/30 |
| 3,622,009 A | | 11/1971 | Bordner | 210/528 |
| 3,672,512 A | | 6/1972 | Werner | 210/523 |
| 4,127,397 A | * | 11/1978 | O'Nan et al. | 55/479 |
| 4,428,841 A | | 1/1984 | Favret, Jr. | 210/747 |
| 4,913,819 A | | 4/1990 | Patterson | 210/523 |
| 5,094,823 A | | 3/1992 | Love | 422/198 |
| 5,238,154 A | * | 8/1993 | Zuriel | 222/189.06 |
| 5,346,101 A | * | 9/1994 | Hargis et al. | 222/195 |
| 5,578,203 A | | 11/1996 | Ford et al. | 210/168 |
| 5,612,003 A | | 3/1997 | Heumann | 422/139 |
| 5,853,597 A | | 12/1998 | Yoshioka et al. | 210/712 |

FOREIGN PATENT DOCUMENTS

| | | |
|---|---|---|
| GB | 584019 | 1/1947 |
| GB | 1424261 | 2/1976 |

* cited by examiner

Primary Examiner—Joseph A. Dillon  
(74) Attorney, Agent, or Firm—Sheridan Ross P.C.

(57) ABSTRACT

An apparatus and method for conveying solids from a process vessel in which the vessel has a plurality of eductors sequentially oriented end-to-end from a vessel inlet to the vessel outlet. Conveying fluid enters the inlet drawing bulk particulates via the eductor series through the outlet.

8 Claims, 2 Drawing Sheets

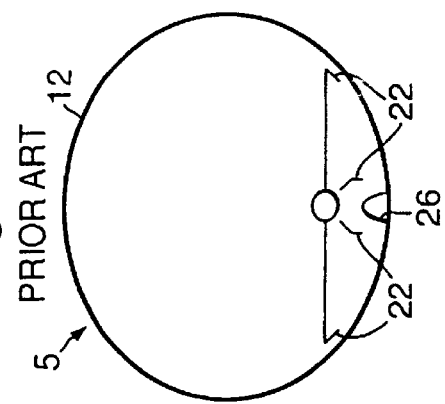
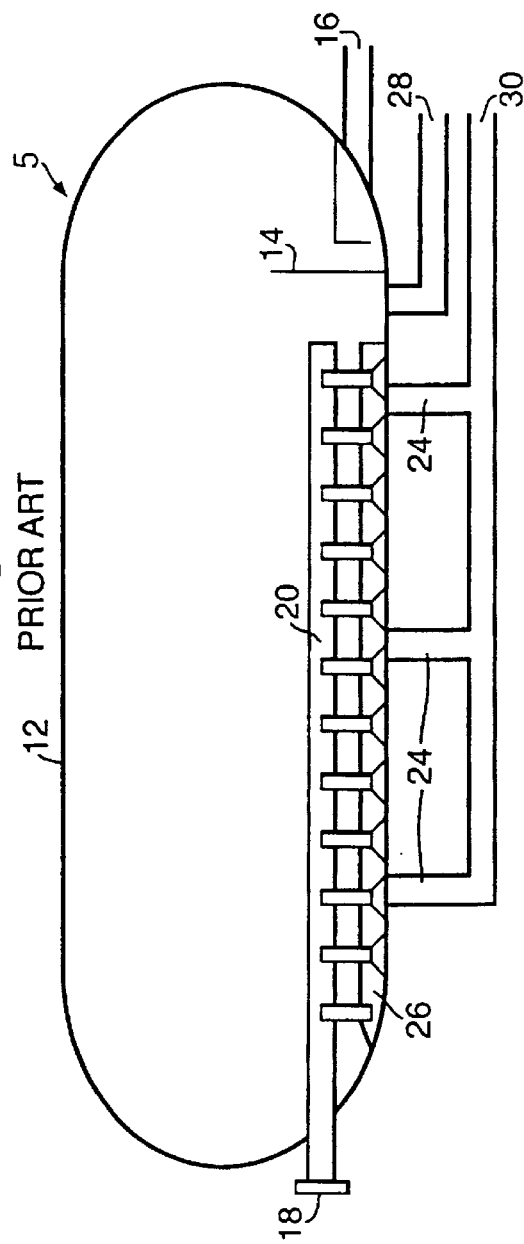
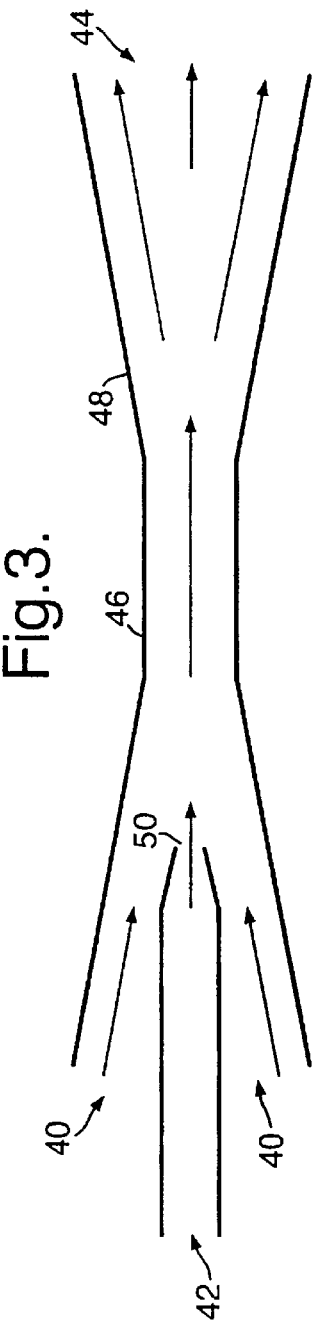

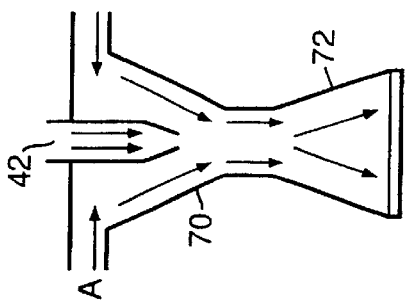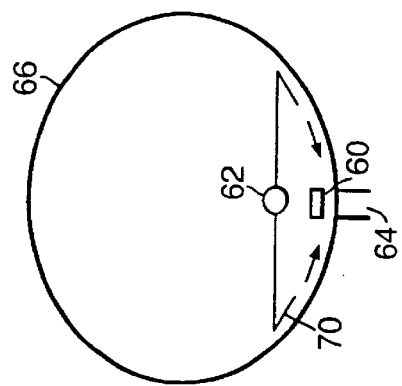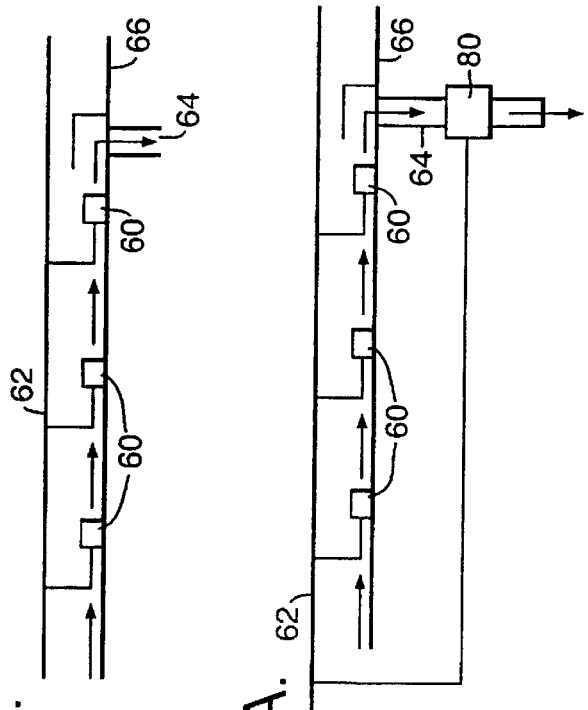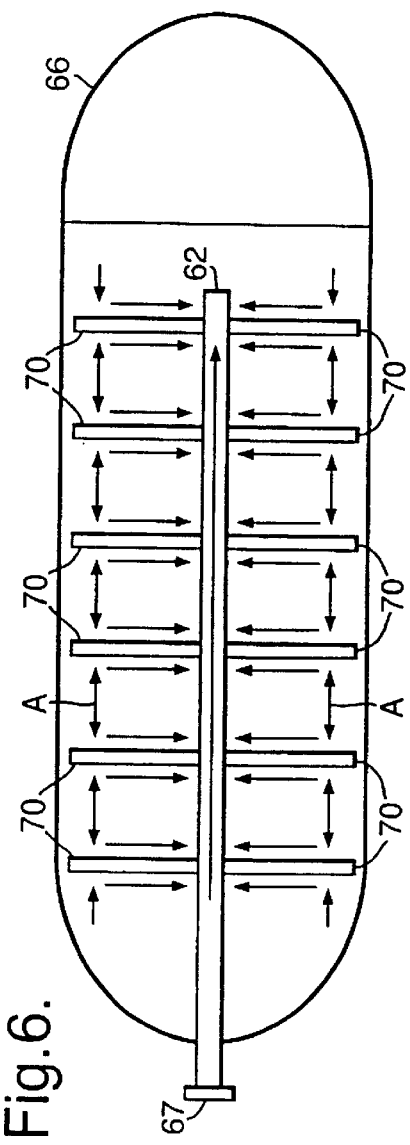

CONVEYOR APPARATUS

This invention relates to conveyor apparatus and particularly though not exclusively to conveyor apparatus for conveying solid material such as sand, from a process vessel.

Most oil and gas producing wells, whether onshore or offshore, typically produce oil, gas, water and solids. The role of an offshore platform or an onshore field facility is to separate these four phases and route only the hydrocarbon streams to the receiving export terminal or refinery. It will be appreciated that often in practice, the associated gas is reinjected or flared. The water is separated i.e. solids are removed, de-oiled and either disposed overboard or reinjected back into the periphery of the oil or gas reservoir or into a separate aquifer.

Solids often appear as sand, clay or silt. These solids generally originate from the reservoir but may also be produced as corrosion by-products from the well tubing and process equipment or as frac sand which has been deliberately injected downhole to increase the permeability of the reservoir. The amount, type, size and production variability of the solids produced varies widely from field to field.

Solids production rates do not have to be particularly high before they begin to affect processing of the well output. For example, solids cause particular problems with process vessels such as production gravity separators since the solids settle out in these vessels due to the quiescent environment within the vessels. Typically, as the solids accumulate, the residence times for the liquid phase(s) decline for a given liquid throughput and therefore separation performance is impaired. The solids accumulation in these vessels also forms a good breeding ground for bacterial growth which can cause severe corrosion of the vessel walls.

Also, erosion damage to pipework and valves as a result of sand production is common, particularly in high pressure production. Furthermore, solids can block and disrupt instrumentation such as in line flowmeters and pressure indicators.

The present invention provides conveyor apparatus for conveying solid material in a process vessel comprising, a vessel housing having a housing inlet and a housing outlet, and an eductor having a jet inlet and a solids inlet, positioned within and generally at the bottom of the housing and aligned generally along a path from the housing inlet to the housing outlet, the housing inlet being arranged to feed jetting fluid into the jet inlet of the eductor and the housing outlet being arranged to receive the output of the eductor.

The present invention also provides a process vessel for holding a fluid including the apparatus of the paragraph immediately above.

In a method aspect, the invention provides a method of conveying solids in a process vessel, comprising the step of locating one or more eductor in the bottom of the vessel to form a localised solids jetting flow along the bottom of the vessel.

According to another aspect, the invention provides conveyor apparatus for conveying solids out of a process vessel, including one or more eductor located within the process vessel and arranged to entrain solids and generate a localised solids jetting flow.

According to a further aspect, the invention provides conveyor apparatus for conveying solid material out of a process vessel comprising, a vessel housing having a housing inlet for receiving a jetting fluid and a housing outlet for the exit of solid material, and at least one transverse eductor positioned within the housing, spaced along a path from the housing inlet to the housing outlet and aligned generally transversely of the path and arranged to direct solid material generally downwardly towards the path.

Embodiments of separators in accordance with the invention will now be described, by way of example, with reference to the drawings in which:

FIG. 1 is a schematic side view of a prior art jetting arrangement;

FIG. 2 is a schematic sectional view of FIG. 1 showing the prior art nozzle configuration;

FIG. 3 is a schematic sectional view of a typical eductor;

FIG. 4 is an enlarged schematic sectional view of the bottom part of a process vessel containing conveyor apparatus;

FIG. 4A is an enlarged schematic sectional view of the bottom part of a modified conveyor apparatus;

FIG. 5 is a schematic sectional view of a transverse eductor;

FIG. 6 is a schematic plan view of a process vessel containing conveyor apparatus;

FIG. 7 is a schematic sectional view of the process vessel of FIG.

with reference to FIGS. 1 and 2, a prior art process vessel 10 has a housing 12 with an inlet (not shown) for receiving a mixture of fluids such as gas, oil and water containing solids such as sand. The vessel has a weir 14 and an oil outlet 16.

The vessel shown is just one example of the many arrangements available. Such vessels may be used to separate 2, 3 or 4 phases (oil, water, gas and solids).

In use, the solids tend to settle towards the bottom of the vessel. In order to remove these from the vessel to avoid the problems described above, the solids are periodically "fluidized" with water jets. To facilitate this, the vessel includes a jet water inlet 18 having a generally axial manifold 20 which feeds a plurality of nozzles 22 formed from short lengths of pipe inclined towards the bottom of the vessel.

The solids are fluidized by connecting the inlet 18 to a pressurised water source. The fluidized solids are carried axially by the water to exit through a number of outlets 24 located along the bottom of the vessel. The resulting slurry is then routed through to a collection vessel and subsequently processed.

The nozzles 22 may be adapted to increase the jetting water exit velocity but more usually are simply formed from conventional, unshaped piping.

After being fluidized, the solids are typically guided towards the nearest inlet port of a shroud 26 which runs generally axially along the bottom of the vessel and which covers the jet water outlets 22. Each port in the shroud 26 is aligned with a nozzle 22.

The vessel also includes a water outlet 28 and a solids outlet 30. Outlets for any other phases are not shown.

The prior art configuration shown in FIGS. 1 and 2 is, however, unsatisfactory in operation. Firstly, the critical flow rate required to fluidize the solids is not known. Therefore, this type of jetting arrangement is designed using very conservative design parameters which leads to non-optimal performance. In particular, higher jetting flow rates are used than are necessary which is wasteful of jetting fluid. If the vessel is a separator, there is also an increased risk of reducing the vessel's performance in separating water and hydrocarbons.

Additionally, the nozzles 22 are prone to blocking since they become buried as the solids accumulate at the bottom of the vessel. This leaves zones in the vessel which are quiescent and thus will never be cleared of solids.

The design of the manifold 20 is important in order to ensure even jetting flow rates along the length of the vessel 10. However, the design of this is often poor resulting in uneven fluidizing of the solids.

Furthermore, the bulk flow velocity within the axial solids shroud 26 is usually too low to keep the solids fluidized (particularly if the solids have a large diameter). If the solids do not remain fluidized, settlement will occur leading to blockage of the shroud and nozzles and inefficient solids removal.

The prior art arrangement also suffers problems due to erosion of the vessel walls. The nozzles 22 are directed generally towards the vessel walls and thus the solid material is blasted with considerable energy, at the vessel wall. Over time, this causes erosion which eventually leads to perforation of the vessel.

Finally, the nozzles 22 create turbulence. Although the velocity of the jets produced by the nozzles 22 is usually sufficient to fluidize the solids, the jetting streamlines are poorly controlled and thus plumes of solids are ejected into the upper reaches of the liquid filled region of the vessel 10. This may cause disturbance to liquid-liquid separation mechanisms and potentially carry solids into both the water and hydrocarbon streams of a separator.

With reference to FIG. 3, a typical eductor has a solids inlet 40, a jet inlet 42 and an outlet 44.

The eductor acts as a jet pump which uses some of the energy from a motive fluid entering the jet inlet 42, to entrain another fluid in order to eject it at a higher pressure than that at which it entered the solids inlet 40.

In the case described below, the motive fluid is water which is directed into a convergent section 46 of the eductor. The motive fluid may, for example, be seawater, produced water (produced from the well) or hydrocarbon.

The motive fluid entrains the fluid in which the eductor is submerged and as the entrained fluid enters a divergent section 48, some of the kinetic energy of the motive fluid is converted into pressure energy in the diffuser section. This causes the mixture of motive fluid and fluid entering the solids inlet 40 to be discharged at a higher pressure than the eductor suction pressure present at the solids inlet 40.

Thus, the eductor shown actively-draws fluid from behind the nozzle 50 of the jet inlet 42 and ejects it out of the divergent section 48. A solids inlet may instead or in addition be provided at the convergent section 46; this latter arrangement being particularly useful for the transverse eductors described below.

The characteristic of increased pressure through the eductor means that eductors may be "daisy-chained", i.e. the output of one eductor provides the input for the next eductor in the chain. This is possible because the solids in the fluid passing through the eductor are both drawn and driven rather than just being driven as in a conventional jetting nozzle.

FIG. 4 shows daisy-chained eductors 60 fed from a jet water manifold 62 and arranged to eject solids entrained in a fluid through a solids discharge port 64. By careful selection of the size of the eductors and balancing of the flow rates and velocities, a highly efficient solids transport system can be created where flow vectors are restricted to the area of the eductors. To achieve this, flow continuity from one eductor to the next should preferably be maintained. Thus, the total flow output (motive fluid and eductor suction fluid) from all upstream eductors feeding a downstream eductor should ideally equal the suction fluid inlet flow of that downstream eductor.

By locating daisy-chained eductors generally at the bottom of a separator housing 66 as shown in FIGS. 6 and 7, a solids jetting flow which is highly localized may be created at the bottom of the vessel. This ensures minimum disturbance to the separator's bulk flow in the upper regions of the housing 66. The housing 66 has an inlet 67 for the jet water manifold 62.

In a preferred embodiment, not only does the housing 66 have daisy-chained eductors located at its bottom but also a second set of eductors 70 located along the housing side wall transversely of the daisy-chained eductors 60. This second set of transverse eductors 70 fluidize the side, wall region and direct the solids to the bottom of the housing. The axial eductors 60 transport the solids along the bottom in the direction of the bulk fluid flow in the vessels, to the solids discharge port 64.

The transverse eductors 70 draw their source generally horizontally from either side along the side wall as shown by arrows A in FIGS. 5 and 6 and eject the flow to form a high velocity expanding "sheet" preferably achieved by the diffuser section 72 having a high cross-sectional aspect ratio (and arranging for the longer side to be parallel to the side wall).

The outlet of the transverse eductors 70 is drawn by the axial eductors 60 through about 90° and is then transported axially along the bottom of the housing 66 by the axial eductors 60 to the nearest solids outlet 64.

It will be appreciated that the transverse eductors may be inclined so that the flow through those eductors has an axial as well as a vertical component. In that case, the outlet of the transverse eductors may be drawn through substantially more or less than 90°.

The various arrangements described above create a localized high velocity stream along the housing bottom which ideally is sufficient to fluidize only the bottom region of the solids layer and direct it to the solids discharge port 64. If this is achieved, as the fluidized solids are transported away, the solids particles collapse downwards from the layer above into the high velocity jet stream and are themselves fluidized and transported away to the discharge port 64. The effect is that the solids layer is "eaten away" from the bottom of the layer.

As discussed above, it is important at least in separating applications to ensure that there is minimal upward flow of jetting fluid to limit the impact of the jetting procedure on the separation process occurring in the higher regions of the housing 66. In the arrangement described above, the upper, unfluidized solids layer restricts the potential for flow disturbance to occur in the upper regions of the housing.

As a further enhancement, one or more outlet eductor 80 (as shown in FIG. 4A) may be used to draw fluidized solids from the solids outlet 64. The outlet eductor 80 may be supplied with motive fluid from the manifold 62.

Flow through the solids outlet 64 may also be enhanced by one or more generally vertical eductor inside the housing 66 taking the generally horizontal outlet of the preceding axial eductors 60 and directing it downwardly to the solids outlet 64. This may be used as well as or instead of the outlet eductor 80.

It will be appreciated that there are several variations which may be made to the arrangement described above. For example, the process vessel 66 may have more than one solids outlet 64 which may be arranged to receive the output from one or more of the axial eductors 60. Furthermore, one or more of this plurality of outlets 64 may be coupled to one or more outlet eductor 80.

The advantage of having several outlets 64 is that the volume which must be drawn out of the axial eductor daisy-chain by the outlet 64 may be controlled. A single outlet at the end of the daisy-chain will be required to accommodate a greater volume of fluidized solids than several outlets, at spaced intervals along the daisy-chain. The use of outlet eductors greatly enhances the performance of the discharge port 64 by actively drawing material out of the port.

Thus, the arrangement described above provides shorter flushing times, a lower jetting water flow rate and reduced impact to process vessel performance when compared to the prior art arrangements. Furthermore, the probability of sediment being carried into the liquid outlet streams of a separating process vessel is reduced. Also, because the flow of solids is generally parallel to the housing wall, erosion damage to the housing is greatly reduced compared to the prior art arrangement.

Traditionally, the removal of solids from the bottom of a process vessel has been carried out periodically. This is at least in part, because of the disruption that the jetting procedure has traditionally caused to the operation of the process vessel. The arrangements described above can also be used periodically in this way. However, the arrangements described above may also be used on a continuous basis. This is particularly advantageous where the volume of solids produced is high and consequently where periodic removal must be carried out at shortly spaced intervals. By continuously operating the conveyor apparatus at low jetting flow rates, removal of solids is achieved with minimum disruption to the operation of the process vessel.

Although only horizontal process vessels have been described, it will be appreciated that the invention is equally applicable to other arrangements, for example, vertical process vessels or separators.

It will also be appreciated that the arrangement described above may be altered for different applications. For example, it may not always be necessary to include the axial eductors 60. Transverse eductors 70 may be used alone in some applications. One such application is in pressurised process vessels. In this application, the transverse eductor 70 operate to move solids to the bottom of the vessel. When the vessel is opened and depressurised, the depressurisation draws the solids out of the vessel.

In the context of the present application, the term "process vessel" should be taken to include not only the separators described above but any fluid-containing vessel in which solids may accumulate. A process vessel typically provides "residence time". It may for example be a phase separator, or a holding tank. It also may be a pressurised container.

The process vessel housing 66 may be provided with one or more weir located on the downstream side of a solids outlet 64. The weir helps to collect sand adjacent the solids outlet 64 and also helps to prevent disturbance of the upper regions of the housing.

What is claimed:

1. A process vessel having a jetting inlet and a solids outlet, and a plurality of eductors each having a jet inlet and a solids inlet, the eductors being positioned within and generally at, the bottom of the vessel and arranged in sequence generally along a path from the jetting inlet to the solids outlet, the jetting inlet being arranged to feed jetting fluid into the jet inlet of a first eductor in the sequence and the solids outlet being arranged to receive the output of a last eductor in the sequence, and each eductor intermediate the said first and last eductors being arranged such that its respective solids inlet receives the output of the immediately preceding eductor in the sequence.

2. A vessel according to claim 1, including an outlet eductor outside the vessel coupled to receive the output of the-solids outlet.

3. A vessel according to claim 1, or claim 2, a plurality of solids outlets each arranged to receive the output of one or more respective eductor.

4. A vessel according to claim 3, including a plurality of outlet eductors outside the vessel each coupled to receive the output of one or more of the solids outlets.

5. A vessel according to claim 1 or claim 5, including one or more transverse eductor positioned within the vessel and aligned generally transversely of the path, the or each transverse eductor being arranged to guide solid material generally downwardly towards the said path.

6. A process vessel according to claim 1, or claim 2, wherein fluid flows through the vessel from a fluid inlet to a fluid outlet and in which the said path is generally parallel to the direction of bulk fluid flow of the fluid.

7. A method of conveying solids in a process vessel, comprising the step of locating a plurality of eductors in sequence with the outlet of each intermediate eductor in the sequence feeding into the solids inlet of the next eductor in the sequence, the eductors being located generally in the bottom of the vessel and arranged to form a localized solids jetting flow along the bottom of the vessel.

8. The method of claim 7, further comprising the step of locating one or more eductor-inside the vessel wall arranged to direct solids downwardly along the vessel wall towards the localized jetting flow.

* * * * *

UNITED STATES PATENT AND TRADEMARK OFFICE
CERTIFICATE OF CORRECTION

PATENT NO.      : 6,619,889 B1
DATED           : September 16, 2003
INVENTOR(S)     : Sinker et al.

It is certified that error appears in the above-identified patent and that said Letters Patent is hereby corrected as shown below:

<u>Column 6,</u>
Line 22, after "or claim 2," please insert -- having -- therein.
Line 28, please delete "5" and insert -- 2 -- therein.

Signed and Sealed this

Thirtieth Day of December, 2003

JAMES E. ROGAN
*Director of the United States Patent and Trademark Office*